United States Patent
Mothier

(10) Patent No.: US 11,299,006 B2
(45) Date of Patent: Apr. 12, 2022

(54) THERMOREGULATION SYSTEM FOR AN ELECTRICALLY DRIVEN VEHICLE, AND VEHICLE COMPRISING SUCH A SYSTEM

(71) Applicant: VOLVO TRUCK CORPORATION, Gothenburg (SE)

(72) Inventor: Ronan Mothier, Dizimieu (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 24 days.

(21) Appl. No.: 16/970,445

(22) PCT Filed: Mar. 28, 2018

(86) PCT No.: PCT/EP2018/057955
§ 371 (c)(1),
(2) Date: Aug. 17, 2020

(87) PCT Pub. No.: WO2019/185140
PCT Pub. Date: Oct. 3, 2019

(65) Prior Publication Data
US 2021/0001683 A1 Jan. 7, 2021

(51) Int. Cl.
*B60H 1/00* (2006.01)
*B60L 58/26* (2019.01)
(Continued)

(52) U.S. Cl.
CPC ..... *B60H 1/00392* (2013.01); *B60H 1/00278* (2013.01); *B60H 1/00328* (2013.01);
(Continued)

(58) Field of Classification Search
CPC ............ B60H 1/00392; B60H 1/00278; B60H 1/00328; B60H 1/00485; B60H 1/00885;
(Continued)

(56) References Cited

U.S. PATENT DOCUMENTS 9,855,815 B2    1/2018  Saab et al.
2008/0251235 A1 10/2008 Zhou
(Continued)

FOREIGN PATENT DOCUMENTS

EP    2746110 A1   6/2014
EP    2853711 A1   4/2015

OTHER PUBLICATIONS

International Search Report and Written Opinion dated Oct. 31, 2018 in corresponding International PCT Application No. PCT/EP2018/057955, 10 pages.

*Primary Examiner* — Davis D Hwu
(74) *Attorney, Agent, or Firm* — Venable LLP; Jeffri A. Kaminski

(57) ABSTRACT

This thermoregulation system (1) for an electrically driven vehicle (V), the vehicle comprising at least one electric machine (E), at least one battery (30), and at least one power electronics component (37), comprises a coolant circuit (5), a pump (7), coolant heat exchangers, connected to the coolant circuit (5) so that the coolant may circulate through them and comprising a main exchanger (9), configured for exchanging heat between the coolant and air coming from the outside of the vehicle (V), at least one battery exchanger (11), configured for exchanging heat between the coolant and said at least one battery (30), and at least one secondary exchanger (13, 36), configured for exchanging heat between the coolant and said at least one electric machine (E) and/or said at least one power electronics component (37). The coolant circuit (5) is divided in a first branch (B1), which comprises the main exchanger (9) and the at least one battery exchanger (11), a second branch (B2) which comprises the at least one secondary exchanger (13, 36), the coolant being circulated in parallel in the first and second branches (B1, B2), and a pump branch (PB) to which the pump (7) is connected, the pump branch (PB) being connected to the (Continued)

first and second branches (B1, B2) by an upstream and a downstream connection points (P1, P2) so that the coolant circulating in the pump branch (PB) is formed by a mix of the coolant circulating in the first branch (B1) and of the coolant circulating in the second branch (B2), and is directed towards the first and second branches (B1, B2) downstream the pump (7).

13 Claims, 1 Drawing Sheet

(51) Int. Cl.
　　　*B60H 1/06*　　　(2006.01)
　　　*B60H 1/14*　　　(2006.01)
　　　*B60K 11/04*　　 (2006.01)
(52) U.S. Cl.
　　　CPC ..... *B60H 1/00485* (2013.01); *B60H 1/00885* (2013.01); *B60H 1/06* (2013.01); *B60H 1/143* (2013.01); *B60K 11/04* (2013.01); *B60L 58/26* (2019.02); *B60H 2001/00307* (2013.01); *B60H 2001/00942* (2013.01)
(58) Field of Classification Search
　　　CPC ............... B60H 1/06; B60H 1/143; B60H 2001/00307; B60H 2001/00942; B60L 58/26; B60K 11/04
　　　USPC ..................................................... 62/259.2
　　　See application file for complete search history.

(56) References Cited

U.S. PATENT DOCUMENTS

| | | | |
|---|---|---|---|
| 2014/0374081 A1* | 12/2014 | Kakehashi | B60H 1/04 165/202 |
| 2015/0101789 A1* | 4/2015 | Enomoto | B60L 50/16 165/202 |
| 2016/0107508 A1 | 4/2016 | Johnston | |
| 2016/0318499 A1* | 11/2016 | Yamanaka | B60H 1/32284 |
| 2016/0344075 A1* | 11/2016 | Blatchley | B60W 20/15 |

* cited by examiner

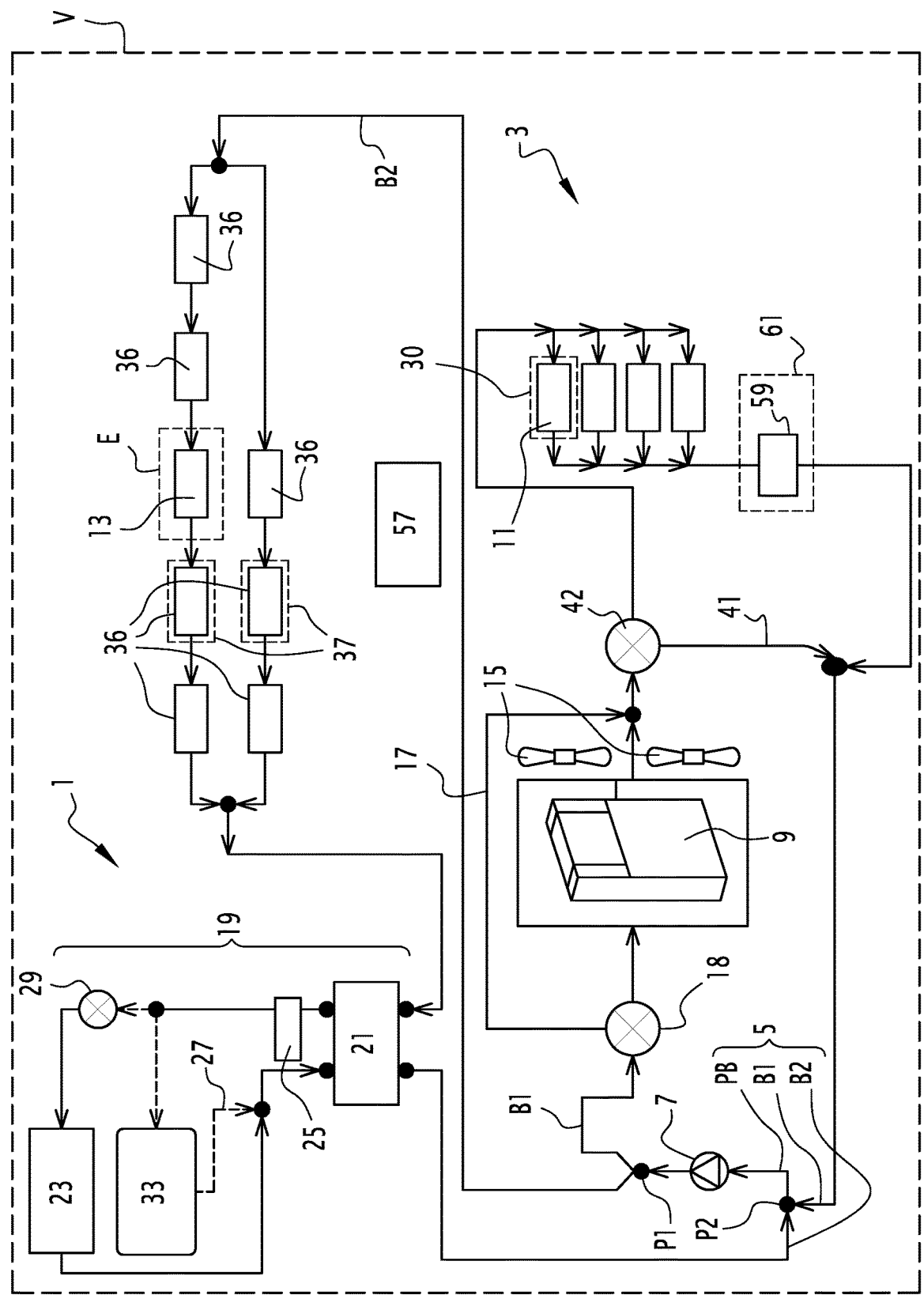

THERMOREGULATION SYSTEM FOR AN ELECTRICALLY DRIVEN VEHICLE, AND VEHICLE COMPRISING SUCH A SYSTEM

CROSS-REFERENCE TO RELATED APPLICATIONS

This application is a U.S. National Stage application of PCT/EP2018/057955, filed Mar. 28, 2018, and published on Oct. 3, 2019, as WO 2019/185140 A1, all of which is hereby incorporated by reference in its entirety.

The present invention concerns a thermoregulation system for an electrically driven vehicle. The invention also concerns an electrically driven vehicle comprising such a thermoregulation system.

Electric vehicles have very different needs in the field of cooling than diesel vehicles, such as trucks. The batteries that power the electric machine of an all-electrical vehicle, or hybrid vehicle, or fuel-cell powered electrical vehicle require a low temperature to work properly, for example between 20° C. to 35° C., while electric components such as electric machines, inverters, various electrical components called power electronics components electrical machines can support higher temperatures, around 50-60° C. There is therefore a need for a cooling system with two levels of temperature with high constraints on costs, weights, packaging and efficiency, which is difficult to implement in truck architecture.

Usually, the way to obtain two levels of temperature in cooling is to duplicate the coolant circuit loops. However, this implies the use of two pumps, two radiators, two expansion tanks, two sets of fans and many electro valves. These solutions are not optimized in terms of costs, weight, packaging and efficiency.

The aim of the invention is to provide a new thermoregulation system, in which the management of two levels of temperature is obtained with fewer components than in standard systems.

To this end, the invention concerns a thermoregulation system for an electrically driven vehicle, the vehicle comprising:
  at least one electric machine, and
  at least one battery for storing electrical energy for powering said at least one electric machine and
  at least one power electronics component,
  the thermoregulation system comprising:
  a coolant circuit in which circulates a coolant,
  a pump for circulating the coolant,
  coolant heat exchangers, connected to the coolant circuit so that the coolant may circulate through them and comprising:
    a main exchanger, configured for exchanging heat between the coolant and air coming from the outside of the vehicle;
    at least one battery exchanger, configured for exchanging heat between the coolant and said at least one battery;
    at least one secondary exchanger, configured for exchanging heat between the coolant and said at least one electric machine and/or said at least one power electronics component.

The thermoregulation system is characterized in that the coolant circuit is divided in:
  a first branch, which comprises the main exchanger and the at least one battery exchanger,
  a second branch which comprises the at least one secondary exchanger, the coolant being circulated in parallel in the first and second branches, and
  a pump branch to which the pump is connected, the pump branch being connected to the first and second branches by an upstream and a downstream connection points so that the coolant circulating in the pump branch is formed by a mix of the coolant circulating in the first branch and of the coolant circulating in the second branch, and is directed towards the first and second branches downstream the pump.

With the implementation of the primary exchanger in the same branch as the battery exchanger, and the electric machine and/or power electronics components exchanger in a distinct branch, the cooling circuit of the battery can get a cooler temperature than the electric machine and/or power electronics components with a circuit that has fewer components, in particular only one pump. This allows a cost, weight and components volume reduction.

According to other aspects of the invention which are advantageous but not compulsory, such a thermoregulation system may incorporate one or several of the following features:
  The main exchanger is located upstream the at least one battery exchanger.
  The main exchanger is formed by at least one radiator.
  The main exchanger is equipped with at least one fan accelerating air passage in the main exchanger.
  The coolant circuit comprises a bypass line allowing reduction or deactivation of coolant circulation in the main exchanger.
  The coolant circuit comprises a bypass line allowing isolation of the at least one battery exchanger from the coolant circuit.
  The thermoregulation system comprises a heating system connected to the second branch and adapted to heat up a conditioned air flow circulating in a driver cabin of the vehicle.
  The heating system is located downstream the at least one secondary exchanger.
  The second branch is also connected to at least one supplemental exchanger of the thermoregulation system configured for exchanging heat between the coolant and at least one inverter of the vehicle.
  The first branch comprises a heat exchanger configured for exchanging heat with at least one low temperature power electronics component of the electrical vehicle.
  The thermoregulation system comprises at least one control unit adapted to control various working parameters of the thermoregulation system.
  At least one control unit is adapted to control at least one of:
    the pump,
    a fan accelerating air passage in the main exchanger,
    a valve allowing coolant circulation in a bypass line allowing deactivation of coolant circulation in the main exchanger and
    a heating system connected to the second branch and adapted to heat up a conditioned air flow circulating in a driver cabin of the vehicle.

The invention also concerns an electrically driven vehicle comprising at least one electric machine and at least one battery for storing electrical energy for powering the at least one electric machine, wherein it comprises a thermoregulation system as mentioned here-above.

The invention will now be explained in reference to the annexed drawings, as an illustrative example. In the annexed drawings:

FIG. 1 is a schematic view of a thermoregulation system according to the invention integrated in an electrically driven vehicle according to the invention.

FIG. 1 represents a thermoregulation system 1 installed on an electrically driven vehicle V, such as a truck. The electrically driven vehicle V may be a hybrid vehicle, including also a non-shown internal combustion engine, or a full-electric vehicle or a fuel cell powered vehicle.

The vehicle V comprises at least one electric machine E, and a battery system 3 for storing electrical energy for powering the electric machine E. The battery system 3 is formed by a plurality of batteries 30. More generally, the vehicle V comprises at least one battery 30.

The thermoregulation system 1 comprises a coolant circuit 5 in which a coolant circulates, under action of a pump 7. The thermoregulation system 1 comprises coolant heat exchangers, connected to the coolant circuit 5 so that the coolant may circulate through them. The exchangers comprise a main exchanger 9, configured for exchanging heat between the coolant and air coming from the outside of the vehicle V. For example, the main exchanger 9 may be formed by at least one radiator. In the main exchanger, the coolant gets cooled down giving the heat to the exterior air flow.

The exchangers also comprise a plurality of battery exchangers 11, each configured for exchanging heat between the coolant and one of the batteries 30 of the battery system 3. In case the vehicle V comprises only one battery 30, the thermoregulation system 1 comprises only one battery exchanger 11. Only one battery 30 is represented in dotted lines around a battery exchanger 11 for the sake of clarity of the drawings.

The exchangers also comprise a secondary exchanger 13, configured for exchanging heat between the coolant and the electric machine E. The electric machine E is represented in dotted lines around the secondary exchanger 13.

The coolant circuit 5 is divided in:
- a first branch B1, called low temperature branch, which comprises the main exchanger 9 and the battery exchangers 11,
- a second branch B2, called high-temperature branch, which comprises the secondary exchanger 13.
- a pump branch PB to which the pump 7 is connected.

The coolant circulates in parallel in the two branches B1 and B2. The pump branch PB is connected to the first and second branch B1 and B2 by an upstream connection point P1 and by a downstream connection point P2, so that the coolant circulating in the pump branch PB is formed by a mix of the coolant circulating in the first branch B1 and of the coolant circulating in the second branch B2, and is directed towards the first and second branches B1 and B2 downstream the pump 7.

Due to the fact that the first branch B1 comprises the main exchanger 9, the temperature of the coolant of the first branch B1 is lower than the temperature of the coolant in the second branch B2. This allows cooling down the batteries 30 to a lower temperature than the electric machine E, which can work at higher temperatures.

In an embodiment, the primary exchanger 9 is located upstream the battery exchangers 11. In other words, the battery exchangers 11 are located at the coldest area of the coolant circuit 5. This guarantees the optimized operation of the thermoregulation system 1 and that the batteries 30 work in their required temperature interval.

According to an optional embodiment, the main exchanger 9 is equipped with at least one fan, for example two fans 15, accelerating air passage in the main exchanger 9. This allows cooling down the coolant to a lower temperature after circulation in the main exchanger 9.

According to an optional embodiment, the coolant circuit 5 comprises a bypass line 17 allowing reduction or deactivation of coolant circulation in the main exchanger 9. The coolant can be derived into the bypass line 17 using a valve 18 connected on the first branch B1. Such a feature allows reduction or deactivation of thermal exchange between the coolant and exterior air in the event the coolant is already at a low enough temperature.

According to an embodiment, the second branch B2 is connected to a heating system 19 for a driver cabin. In order to benefit from the heating of the coolant that results from the passage in the secondary exchanger 13, the heating system 19 may be located downstream the secondary exchanger 13.

The heating system 19 may be connected to the coolant circuit 5 via a pressure valve 21. The heating system 19 may comprise a heat exchanger 23, adapted to exchange heat with a conditioned air flow circulating in the driver's cabin. As an optional embodiment, an electrical heating device 25 may be connected to the heating system 19 upstream from the heating exchanger 23, in order to heat up the coolant in case the temperature of the coolant is too far from a requested temperature.

The thermoregulation system comprises an expansion tank 33, that is located in the heating system 19, but could be provided at any place of the system as long as it is the highest point of the circuit. The expansion tank 33 absorbs coolant expansion due to temperature and ensures a continuous coolant de-aeration. The expansion tanks 33 is provided in a line 27 parallel to the heating exchanger 23, and a valve 29 controls the distribution of fluid flows in the line 27 and in the heating exchanger 23.

The second branch B2 may also be connected to at least one supplemental exchanger configured for exchanging heat between the coolant and at least one supplemental electrical device of the vehicle V. In the present case, the thermoregulation system 1 comprise several other exchangers 36 that are coupled to various other electrical equipment placed upstream or downstream the electric machine E, such as electrical inverters 37, transmission, auxiliaries (like air compressor for example), amongst others. This electrical equipment may include at least one power electronics component, such as an inverter. At least one of the electrical converters 37 may be an inverter. At least some of these supplementary exchangers 36 may be installed in parallel with the secondary exchanger 13 or with other supplementary exchangers 36. Electrical components that have the most critical working temperature intervals are placed at the most upstream position. The electrical components mentioned here-above and the electric machine E have a working temperature between 40° C. and 65° C., and are less sensitive to high temperatures than the batteries 30.

According to a non-shown embodiment, the second branch B2 may be adapted to cool down the electrical engine E only, or the at least one power electronics component only, or both. The supplementary exchangers 36 may be considered more generally as secondary exchangers similar to the secondary exchanger 13.

The coolant circuit 5 comprises a bypass line 41 allowing isolation of the battery exchangers 11 from the coolant circuit 5. The coolant is derived in the bypass line 41 using a valve 42. In such a case, a cooling down of the batteries 30 at a too low temperature is prevented. In case the batteries 30 need to be heated up, the isolation from the coolant circuit 5 prevents the whole coolant circuit 5 to be heated up. This results in better performances and lower energetic cost.

As an optional embodiment, the first branch B1 may also include a heat exchanger 59, configured for exchanging heat with at least one low temperature power electronics component 61 of the electrical vehicle V. Such a component 61 may require a low working temperature interval similar to the low working temperatures of the batteries 30. The heat exchanger 59 may be connected to the first branch B1 downstream or upstream the battery exchangers 11, depending on temperature requirements. In the example, the heat exchanger 59 may be able to be isolated from the cooling circuit 5 using the bypass line 41. As a non-shown variant, the heat exchanger 59 may not be able to be isolated from the cooling circuit 5 using the bypass line 41.

The thermoregulation system 1 may comprise at least one control unit, for example one control unit 57, adapted to control various working parameters of the thermoregulation system 1. The control unit 57 may receive working parameters and data from sensors arranged at various places of the coolant circuit 5, such as coolant temperature, temperatures of batteries 30, of the electrical engine E, for example. The control unit 57 may send control signals to the various components of the thermoregulation system 1, for example valves, pumps, heaters, and fans. The control unit 57 may be equipped with a communication device adapted to receive and emit signals, with wired or wireless communications means.

For example, the control unit 57 may be adapted to control the operation of the pump 7 to regulate the coolant flow in the coolant circuit 5.

For example, the control unit 57 may be adapted to control the valve 18, to partially or totally bypass the main exchanger 9, in case the coolant temperature is already cold enough.

For example, the control unit 57 may be adapted to control the valve 42, to bypass the battery exchangers 11, in case the coolant temperature is too cold.

For example, the control unit 57 may be adapted to activate or deactivate the fans 15 if a special cooling need is detected in the coolant circuit 5.

For example, the control unit 57 may be adapted to activate or deactivate the heating device 25, depending on the conditioned air temperature requests in the driver's cabin. The thermoregulation system 1 can be applied to various electrically driven vehicles, such as trucks, buses, trailers, utility automotive vehicles, cars, or any land vehicle.

The features of the embodiments and variants described here-above can be combined to form new embodiments of the invention.

The invention claimed is:
1. A thermoregulation system for an electrically driven vehicle, the vehicle comprising:
at least one electric machine, and
at least one battery for storing electrical energy for powering said at least one electric machine,
at least one power electronics component,
the thermoregulation system comprising:
a coolant circuit in which circulates a coolant,
a pump for circulating the coolant,
coolant heat exchangers, connected to the coolant circuit so that the coolant may circulate through them and comprising:
a main exchanger, configured for exchanging heat between the coolant and air coming from the outside of the vehicle;
at least one battery exchanger, configured for exchanging heat between the coolant and said at least one battery;
at least one secondary exchanger, configured for exchanging heat between the coolant and said at least one electric machine and/or said at least one power electronics component,
wherein the coolant circuit is divided in:
a first branch, which comprises the main exchanger and the at least one battery exchanger,
a second branch which comprises the at least one secondary exchanger, the coolant being circulated in parallel in the first and second branches, and
a pump branch to which the pump is connected, the pump branch being connected to the first and second branches by an upstream and a downstream connection points so that the coolant circulating in the pump branch is formed by a mix of the coolant circulating in the first branch and of the coolant circulating in the second branch, and is directed towards the first and second branches downstream the pump.

2. A thermoregulation system according to claim 1, wherein the main exchanger is located upstream the at least one battery exchanger.

3. A thermoregulation system according to claim 1, wherein the main exchanger is formed by at least one radiator.

4. A thermoregulation system according to claim 1, wherein the main exchanger is equipped with at least one fan accelerating air passage in the main exchanger.

5. A thermoregulation system according to claim 1, wherein the coolant circuit comprises a bypass line allowing reduction or deactivation of coolant circulation in the main exchanger.

6. A thermoregulation system according to claim 1, wherein the coolant circuit comprises a bypass line allowing isolation of the at least one battery exchanger from the coolant circuit.

7. A thermoregulation system according to claim 1, wherein the thermoregulation system comprises a heating system connected to the second branch and adapted to heat up a conditioned air flow circulating in a driver cabin of the vehicle.

8. A thermoregulation system according to claim 7, wherein the heating system is located downstream the at least one secondary exchanger.

9. A thermoregulation system according to claim 1, wherein the second branch is also connected to at least one supplemental exchanger of the thermoregulation system configured for exchanging heat between the coolant and at least one inverter of the vehicle.

10. A thermoregulation system according to claim 1, wherein the first branch comprises a heat exchanger configured for exchanging heat with at least one low temperature power electronics component of the electrical vehicle.

11. A thermoregulation system according to claim 1, wherein the thermoregulation system comprises at least one control unit adapted to control various working parameters of the thermoregulation system.

12. A thermoregulation system according to claim 11, wherein said at least one control unit is adapted to control at least one of:
the pump,
a fan accelerating air passage in the main exchanger, a valve allowing coolant circulation in a bypass line allowing deactivation of coolant circulation in the main exchanger, a heating system connected to the second branch and adapted to heat up a conditioned air flow circulating in a driver cabin of the vehicle.

13. An electrically driven vehicle comprising at least one electric machine, at least one battery for storing electrical energy for powering said at least one electric machine, and at least one power electronics component, wherein it comprises a thermoregulation system according to claim 1.

\* \* \* \* \*